(12) United States Patent
Konrad et al.

(10) Patent No.: US 10,954,575 B2
(45) Date of Patent: Mar. 23, 2021

(54) DEVICE AND METHOD FOR TEMPERING SECTIONS OF METAL COMPONENTS

(71) Applicant: Benteler Automobiltechnik GmbH, Paderborn (DE)

(72) Inventors: Stefan Konrad, Paderborn (DE); Max Sander, Hollenstedt (DE); Dieter Wulfes, Borchen (DE); Dimitri Schneider, Schloss Holte Stukenbrock (DE); Simon Werneke, Bueren (DE); Stefan Horn, Bad Emstal (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 465 days.

(21) Appl. No.: 15/750,005

(22) PCT Filed: Jul. 28, 2016

(86) PCT No.: PCT/DE2016/100347
§ 371 (c)(1),
(2) Date: Feb. 2, 2018

(87) PCT Pub. No.: WO2017/020888
PCT Pub. Date: Feb. 9, 2017

(65) Prior Publication Data
US 2018/0237872 A1 Aug. 23, 2018

(30) Foreign Application Priority Data
Aug. 4, 2015 (DE) ..................... 10 2015 112 812.8

(51) Int. Cl.
*C21D 1/40* (2006.01)
*C21D 1/673* (2006.01)
(Continued)

(52) U.S. Cl.
CPC ............... *C21D 1/40* (2013.01); *C21D 1/62* (2013.01); *C21D 1/673* (2013.01); *B62D 25/04* (2013.01); *C21D 2221/00* (2013.01)

(58) Field of Classification Search
CPC ........................................................ C21D 1/40
(Continued)

(56) References Cited

U.S. PATENT DOCUMENTS

2003/0217991 A1  11/2003  Gomez
2011/0315281 A1  12/2011  Charest et al.
(Continued)

FOREIGN PATENT DOCUMENTS

DE       10212820 C1       4/2003
DE    102005018974 A1     11/2005
(Continued)

OTHER PUBLICATIONS

Office Action in DE Application No. 102015112812.8 dated Aug. 21, 2018, 11pp.
(Continued)

*Primary Examiner* — Lori L Baker
(74) *Attorney, Agent, or Firm* — Hauptman Ham, LLP

(57) ABSTRACT

A device and method for tempering sections of hot-formed and/or press-hardened metal components is disclosed having a support structure and a work head, the work head having at least one contact element consisting of an electrically-conductive material, for heating sections of a metal component using a flow of heat. Electrodes for resistively heating the contact element are connected thereto, and to a current source. A hot-formed and/or press-hardened metal component is first provided, and at least one contact element mounted on a work head is heated to a temperature greater than a target temperature to which a section of the metal component is to be heated. A contact surface of said contact (Continued)

element then comes into full-surface contact with the metal component section to be heated, with a predetermined pressing force, such that the metal component is heated to a target temperature in at least some sections by a flow of heat. The contact element is thus heated using resistive heating.

16 Claims, 5 Drawing Sheets

(51) Int. Cl.
    *C21D 1/62*     (2006.01)
    *B62D 25/04*     (2006.01)

(58) Field of Classification Search
    USPC .................................................. 219/50, 544
    See application file for complete search history.

(56) References Cited

U.S. PATENT DOCUMENTS

| | | |
|---|---|---|
| 2013/0196275 A1 | 8/2013 | Schwartz |
| 2014/0083572 A1 | 3/2014 | Schwartz |
| 2015/0159234 A1 | 6/2015 | Steffens et al. |
| 2015/0211085 A1 | 7/2015 | Harris et al. |
| 2015/0282253 A1 | 10/2015 | Lackmann et al. |

FOREIGN PATENT DOCUMENTS

| | | |
|---|---|---|
| DE | 102009016027 A1 | 10/2010 |
| DE | 102011078075 A1 | 3/2012 |
| DE | 102013011572 A1 | 1/2015 |
| EP | 2439289 A1 | 4/2012 |
| EP | 2497840 A1 | 9/2012 |
| EP | 2883967 A1 | 6/2015 |
| EP | 2924130 A1 | 9/2015 |
| WO | 2014058567 A1 | 4/2014 |

OTHER PUBLICATIONS

Office Action for Chinese Application No. 201680044040.3 dated Jun. 27, 2019; 10pp.
German OA for DE 10 2015 112 812.8 mailed May 3, 2016; 7 pp.
German OA for DE 10 2015 112 812.8 mailed Sep. 5, 2017; 5 pp.
ISR for PCT/DE2016/100347 dated Dec. 21, 2016; 14 pp.
Office Action for Chinese Application No. 201680044040.3 dated Jan. 7, 2020; 4pp.
Office Action for German Application No. 10 2015 112 812.8 dated Apr. 4, 2019 10pp.

DEVICE AND METHOD FOR TEMPERING SECTIONS OF METAL COMPONENTS

RELATED APPLICATIONS

The present application is a National Phase of International Application Number PCT/DE2016/100347 filed Jul. 28, 2016 and is related to and claims priority benefits from German Application No. 10 2015 112 812.8 filed on Aug. 4, 2015.

FIELD

The disclosure relates to a device and to a method for tempering regions of hot-formed and/or press-hardened metal components.

BACKGROUND

Hot-formed and/or press-hardened components are used in many fields in the automotive industry. By using high-strength or ultra-high-strength steels it is possible for components having high strength and simultaneously low weight to be produced in order for targeted lightweight construction concepts to be implemented.

However, it is envisaged in a multiplicity of components which at times can be shaped in a complex manner that the material properties vary in regions. High strength and low ductility can thus be envisaged in one region of the component, whereas these conditions are to be exactly opposite in other regions of the component.

These tailored properties can be relevant in terms of all components of a motor vehicle, for example A pillars, B pillars, suspension arms, door impact strips, and the like.

After a heat-treatment and press-hardening procedure in which a steel material is heated to a temperature higher than AC3 such that an austenitic microstructure is formed in the material, a forming procedure and a quenching procedure which generates a martensitic microstructure in the formed component follow. The component then has homogenous material properties, that is to say that the entire component has a uniformly high strength and low ductility. In order for the ductility to be increased in regions in a further heat-treatment step, it is known in the prior art for these regions to be subsequently heated and to thus initiate a renewed conversion of the microstructure.

DE 10 2011 078 075 A1 thus discloses a series of methods in which a low tensile strength is to be generated in regions in a formed component. A heat-treatment and press-hardening procedure herein is performed on an initial blank, the resulting product having a substantially uniform first tensile strength. By performing a heat-treatment post-processing on the product it is achieved that a lower second tensile strength is set in regions in the component. The possibility of temperature-controlling the product in regions by using conduction heating is disclosed inter alia herein. The product herein is positioned between heated plates, and a hydraulic cylinder in a tool brings the heated plates into contact with those regions to be heated. Heat conduction from the heated plates into the respective regions of the product is achieved by the pressure.

This approach is disadvantageous in particular when only small regions are to be subsequently heated on the metal components produced. This is the case, for example, when attachment locations for other components, for example hinges or similar, are to be subsequently incorporated, or when the component is yet to be bored or cut in a localized manner. It is advantageous in this instance for the material to have a lower strength at those locations. To this end, the press devices illustrated in DE 10 2011 078 075 A1 are too complex and too expensive, and moreover have a high space requirement. Moreover, said press devices are not suitable for tempering small regions since the high pressures arising cause a high level of wear on the tools.

SUMMARY

It is the object of at least one embodiment of the disclosure to eliminate the disadvantages of the prior art and to propose a device having a low requirement in terms of space, by way of which the local regions of a metal component can be subsequently heat-treated, said device moreover being usable in a mobile manner. At the same time, it is the object of at least one embodiment of the disclosure to provide a method by way of which local regions of a metal component can be heat-treated without complexity, said method moreover causing a low level of wear on the tools.

The device herein is a device for tempering regions of hot-formed and/or press-hardened metal components, having a support frame and a worker head, wherein the worker head has at least one contact element, composed of an electrically conductive material, for heating regions of a metal component by means of a thermal flow, wherein electrodes for the resistive heating of the contact element are connected to the latter as well as to a current source. The worker head is disposed so as to be movable relative to the support frame.

As compared with the known press systems, a device of this type has the advantage of extremely small dimensions and of a construction without complexity. In the simplest case, it is sufficient for only a contact element from an electrically conductive material to be connected to 2 electrodes which in turn are connected to a current source by way of a cable. Such a contact element can then be pressed against the component to be heat-treated or tempered, respectively, with the aid of a manipulator. On account of the contact element being only resistively heated, a complicated electronic switching circle is also not required. Resistive heating means that the contact element is heated by the resistive heat of an electric current flowing through the contact element. In principle, heating is performed by simply switching on the current. The contact element herein can be uniformly temperature-controlled prior to the tempering step, this enabling an extremely precise heating of the metal component precisely in those regions in which tempering is to take place.

Tempering according to one or more embodiments of the disclosure means that a hot-formed and/or press-hardened metal component by way of a heat treatment undergoes a local conversion of the microstructure such that another microstructure other than in the rest of the metal component is present in this temperature-controlled region after the heat treatment has been completed, such that this region has other mechanical properties that are different from those of the rest of the metal component. This means in particular that a higher ductility at a simultaneously lower strength is present in those regions than in the other regions of the metal component.

The arrangement of the one or the plurality of contact elements on the device is almost arbitrary and is to be performed according to practical considerations. For example, a plurality of regions of the component can be tempered in a mutually independent manner by different contact elements. It is also possible herein for each contact element to perform another temperature-controlling action such that the material properties can be set differently for each individual region of the metal component.

It is likewise possible for the contact elements to be shaped in an almost arbitrary manner. These herein can be simple rectangular, round, triangular, or polygon contact elements. It is also possible for the cross-section of the contact elements to be varied in the direction of the current flow such that higher current densities can arise in a localized manner, this going hand-in-hand with a more intensive heating of the contact element. Material properties that vary in a localized manner can thus be set yet again within one region to be tempered.

The metal component to be processed in practice is clamped in a jig so as to avoid distortions that arise during the tempering procedure and so as to position the metal components in a reproducible and consistent manner. Once this has been performed, the worker head can be moved toward the metal component and the contact element can be brought into contact with the metal component.

It is provided in particular that the worker head is disposed so as to be movable in a linear manner from a resting position to an active position. This is preferably achievable by means of a rail guide, on account of which the fundamental principle of a simple construction without complexity is again implemented.

The device for tempering is consequently out of the way while the metal component is clamped into the jig, said device in the meantime being in a resting position. The resistive heating of the contact element can be performed in this resting position, for example. The worker head can be moved to the active position and the tempering procedure can be carried out as soon as the metal component has been moved into the fixed position thereof.

A movable arrangement of the worker head furthermore has the advantage that the entire device does not have to be assembled and disassembled when not being envisaged for use. The worker head in this instance can remain in the resting position.

This is the case, for example, when due to customer specifications not all metal components of a series are to be subjected to tempering in regions.

The at least one contact element is preferably coated with an electrically isolating material. This offers the advantage that the contact element can continue to be heated and does not cool down while said contact element is in contact with the metal component. Constant or controlled temperature-controlling of the contact element can be ensured on account thereof. Without an electrically isolating coating the contact element in this case would short-circuit with the metal component and there would be the risk of the contact element being welded to the metal component or of undesirable electrical currents arising in the metal component.

Irrespectively, there is the possibility for resistive heating to be performed only when the contact element is not in contact with the metal component.

One further embodiment of the disclosure provides that at least two contact elements are disposed so as to be movable relative to one another on the worker head such that the metal element is clampable between the contact elements. The contact elements in this instance, for example in the case of calipers, are disposed so as to be mutually opposite and can converge or diverge relative to one another. Said contact elements clamp the metal element therebetween in such a closing movement. Such an embodiment of the device according to the disclosure leads to the metal element being in stable contact with the contact elements, firstly since the two contact elements in each case form a counter bearing for one another.

Moreover, double the quantity of heat can thus be introduced into a local region of the metal component, on account of which the thick metal sheets in particular can be heated rapidly and reliably. In the case of heating from only one side of the metal sheet there is the problem that the metal sheet in the case of excessively thick metal sheets is not completely heated through. A more uniform heating throughout is consequently achieved by heating from both sides of the metal sheet.

In the case of materials having a high thermal conductivity, there is the risk of the heat rapidly flowing from the contact region between the contact element and the metal component into neighboring regions. This is undesirable since the neighboring regions in this instance also are subjected to a modification of the microstructure which is difficult to control. It is often desirable for the modified material properties to arise in precisely defined regions even without transition reasons. It is important in this instance for the heat to be introduced as rapidly as possible into the component such that an outflow prior to the completion of the conversion of the microstructure is largely avoided. However, if the metal component is clamped between two contact elements, double the quantity of heat is thus introduced in the same time such that the metal sheet can be heated through uniformly in a very rapid manner. The latter thus likewise contributes to the precision of the tempering procedure.

One further embodiment of the disclosure provides that at least one contact element and one thermally insulating and/or electrically isolating element are disposed so as to be movable relative to one another on the worker head such that the metal component is clampable between the contact element and the insulating/isolating element. In a sense, this is the variant that is contrary to the embodiment previously described. This embodiment is advantageous when the metal component in the region to be tempered is to be heated through specifically in an incomplete manner or only a thin sheet metal is to be heated through. The thermally insulating and/or electrically isolating element herein acts in particular as a counter bearing and is preferably configured from ceramic materials having a low thermal conductivity.

It is furthermore provided that the contact element of the device according to one or more embodiments of the disclosure has angled regions to which the electrodes are fastened. Because of the positive electrical conductivity, the electrodes are in most instances composed of copper. The attachments of the copper electrodes to the contact element are cooled in order to avoid damaging material stress. This results in the attachment regions of the contact element to the electrodes having a temperature of approximately 30° C. However, the actual contact face of the contact element that comes into contact with the metal component has a much higher temperature. Temperatures of 1000° C. and more are possible here. This leads to a transition zone in which the temperature rises gradually from 30° C. to more than 1000° C. being formed between the regions of the attachments to the copper electrodes and the contact face. Therefore, those regions in which the electrodes are fastened to the contact element and in which the transition zone is located are angled such that only the contact face of the contact element that has the required target temperature can come into contact with the metal component. It is avoided on account thereof that an incidental contact can arise between the transition region and the metal component. On account of the lower temperatures that prevail in the transition region, this would have the consequence that regions that neighbor the region of the metal component to be tempered are also subjected to a modification of the microstructure, resulting in material properties that gradually differ from those of the region to be tempered.

Furthermore, the fastening locations between the electrodes and the contact element are spaced apart from the metal component on account thereof, such that the fastening locations in the tempering procedure are not unintentionally pressed against the metal component and as a result are subjected to increased wear.

Moreover, improved accessibility to these attachment locations is enabled on account of the angling of the attachment regions for the copper electrodes, such that easier maintenance is possible.

It is furthermore provided in one particular embodiment of the disclosure that the contact element is configured as a metal sheet that in terms of contour is close to the metal component such that a contact face of the contact element and that region of the metal component that is to be heated can be brought into contact across the full area. This is advantageous in particular when the components have a very complex topology and high degrees of forming. A sheet metal that is envisaged as the contact element herein can be formed in the same manner as the metal component such that a contact across the full area is possible between the contact element and the metal component in the region to be tempered. Precise temperature-controlling of the region to be tempered of the metal component is enabled on account thereof without neighboring regions likewise being compromised by an unintentional conversion of the microstructure. This is possible only by way of high complexity in the case of partial tempering with the aid of comparatively large presses.

It is furthermore provided in one particular embodiment that the contact element is configured from an austenitic stainless steel or a ferritic stainless steel. This in particular is a high-grade steel, for example a high-grade steel with the material code 1.4841. However, the exact choice of material depends on the temperature ranges in which the operation takes place when tempering and temperature-controlling the contact element. The material to be used must be sufficiently pressure-resistant since the contact element is brought into contact with the metal component by way of a contact pressure between 10 kPa and 10 MPa. A respective resistance must also be present at the envisaged operating temperatures of up to more than 1000° C. For example, the exemplary high-grade steel material 1.4841 mentioned above is pressure resistant up to 5 MPa at 1000° C.

A device according to one or more embodiments of the disclosure can be used so as to be cyclically coupled in a hot-forming line. A tempering station present therein would be composed of a device according to one or more embodiments of the disclosure for tempering hot-formed and/or press-hardened metal components, and of a jig in which the metal components are clamped, and of one or a plurality of manipulators or robots which place the metal components into the tempering station and remove them therefrom again, respectively.

A plurality of devices according to some embodiments of the disclosure can also be used in one tempering station when a plurality of regions of a metal component are to be tempered.

It is at the same time also possible that the tempering of the hot-formed and/or press-hardened metal components takes place at a place that is different from that of the actual forming of the metal components. It is a great advantage of one or more embodiments of the disclosure proposed that the device by virtue of the construction thereof without complexity can be used in a rapid, variable, and mobile manner. An integration into an existing hot-forming line is readily possible also because of the small space requirement and the simple construction.

A hot-formed and/or press-hardened component is first provided herein. At least one contact element that is attached to a worker head is heated to a temperature which is higher than a target temperature to which a region of the metal component is to be heated. A contact face of the contact element by way of a predetermined contact pressure is then brought to bear across the full area of that region of the metal component that is to be heated, on account of which the metal component in regions by means of a thermal flow is heated to a target temperature. The contact element is heated by means of resistive heating. The worker head is moved from a resting position to an active position in order for the contact element to contact the metal component.

Providing a hot-formed and/or press-hardened component can be performed by means of usual hot-forming tools or hot-forming lines, respectively.

A metal blank, for example a blank or else a tailored blank, is usually heated to a temperature beyond the AC3 temperature of the material to be processed. These temperatures vary from one material to another. Temperatures of more than 850° C., in particular of more than 900° C., are usual here. This heating leads to the microstructure in the metal blank being converted to austenite. The metal blank is thereafter formed in a forming tool and cooled in an extremely rapid manner such that the entire material is converted to a martensitic microstructure. The metal component thus produced is thereafter fed to the tempering procedure. The metal component at this point of time in the normal case is cooled down to room temperature. However, higher temperatures are possible as long as the martensitic finishing temperature of approximately 250° C. is undershot.

A contact element is attached to a worker head, wherein the worker head per se in turn is attached to a support frame. The contact element is resistively heated wherein the heating here is performed by means of a current flow which because of the electrical resistance of the contact element generates a resistive heat in the contact element. This heating is performed in a temporal period between 30 seconds and 15 minutes, preferably of less than 1 minute. The temperature to which the contact element is heated is higher than the target temperature to which a region of the metal component is to be heated. The target temperatures for a tempering procedure, likewise again depending on the material properties to be set and on the material, are preferably between 350° C. etc., and 850° C., a temperature between 750° C. and 790° C. being particularly preferably targeted here. This means that the temperature to which the contact element has to be heated must be higher than 850° C., the temperature preferably being 850° C. to 1050° C. The metal component is clamped in a jig in order for the former to be held in position during the tempering procedure, on the one hand, and in order to avoid potential distortions that arise on account of the heating, on the other hand.

By moving the worker head from a resting position to an active position, the advantages that have already been described in the context of the device arise again here, since the worker head of the device for handling the metal component is removed from the handling region of the metal component, or the device remains in a resting position and does not require any unnecessary requirement of space in the case of tempering not being envisaged, respectively.

It is provided that the worker head moves toward the metal component clamped in a jig, and in consequence the contact element is brought to bear on the metal component. Only a linear movement of the worker head, for example on the rail, can be present herein. Or, the worker head can rotate or be tilted at a joint, or the like. Or, all these movements can be superimposed.

The heated contact face of the contact element then comes to bear across the full area of that region of the metal component that is to be heated, on account of which the contacted region of the metal component to be tempered is heated by the conduction of heat from the contact element into the metal component.

The method proposed enables the regions to be tempered to be temperature-controlled in an extremely precise and sharply delimited manner. Moreover, temperature-controlling is also very precisely foreseeable on account of the resistive heating.

One advantageous embodiment of the method provides that the contact element is not heated while in contact with the metal component.

This means that the contact element is first heated and the resistive heating is switched off prior to the contact element being brought into contact across the full area with the metal component. It is avoided on account thereof that the two items are welded together by way of a short circuit between the contact element and the metal component, and an undesirable current flow through the metal component which goes hand-in-hand with an uncontrolled heating of the metal component is moreover avoided.

In one further embodiment it is provided for the method that the contact pressure is between 100 KPa and 10 MPa, preferably between 100 KPa and 1 MPa. As opposed to commercially available tool presses, the contact pressures applied here are extremely low. It has been demonstrated that by means of the method according to one or more embodiments of the disclosure a sufficiently uniform temperature-controlling of the regions to be tempered is possible even at these relatively low pressures. A sufficiently uniform temperature-controlling is possible even at 100 kPa to 200 kPa. These extremely low contact pressures lead to the wear of the tool on account of the heat-related expansion of the metal components being far less pronounced than would be the case with higher contact pressures. It is thus a particular advantage of the method according to one or more embodiments of the disclosure as well as also of the device that low contact pressures can be used herein, on account of which the device becomes less maintenance-intensive.

A further embodiment of the method provides that the metal component is clamped between two contact elements that are disposed so as to be movable relative to one another on the worker head.

As has already been described above in the context of the explanations pertaining to the device according to one or more embodiments of the disclosure, clamping the metal component between two contact elements that are disposed so as to be movable relative to one another leads to the metal component being heated through in a more rapid and more thorough manner. The metal component in this instance is clamped between the two contact elements as in calipers, for example. The contact elements in this instance are disposed on the worker head such that said contact elements in a closing movement converge or in an opening movement diverge again, respectively. It results as a further advantage that the metal component in the case of the method having this feature can no longer move relative to the contact elements, for example on account of any distortion arising, such that an extremely precise tempering treatment is possible.

It is furthermore provided in one particular design embodiment of the method that the contact element contacts the metal component for a predetermined contact-pressure time. The contact-pressure time is in particular between 2 seconds and 30 seconds, preferably between 3 seconds and 15 seconds. The introduction of heat into the metal component can be likewise controlled with the aid of the contact-pressure time, since a larger quantity of heat is introduced into the metal component by way of a longer contact-pressure time. However, attention must also be paid herein to the contact-pressure time not being chosen to be excessive since the risk of the introduced heat flowing in an uncontrolled manner into neighboring regions of the metal component increases with the increase in contact-pressure time.

It is particularly preferably provided that the contact element as the active position is reached, or thereafter, comes to bear across the full area with that section of the metal component that is to be heated.

In order for the metal component to be clamped, the contact element herein can move separately from the worker head, as has been described above, for example. However, it can also be provided that the contact element comes into contact with the metal component directly on account of the movement of the worker head.

For example, the closing movement when clamping the metal component can thus be initiated, for example, already briefly prior to achieving the active position, and the clamping of the metal component between the contact elements can be completed as the active position is reached. This superimposed movement between the movement of the worker head from the resting position to the active position and bringing to bear the contact element on the metal component can be helpful in particular when the device or the method according to one or more embodiments of the disclosure, are used in a cyclically coupled manner in the context of a hot-forming line, so as to achieve the required cycle times.

Irrespectively, it is of course also possible in the context of one or more embodiments of the disclosure that these two movements are carried out sequentially. This means that the worker head is first moved from the resting position to the active position and the movement of the contact element, for example for clamping the metal component between two contact elements, is carried out thereafter.

It is provided in particular that the method is carried out with the aid of the device such as has been described above.

BRIEF DESCRIPTION OF THE DRAWINGS

For an understanding of embodiments of the disclosure, reference is now made to the following description taken in conjunction with the accompanying drawings, in which.

In the figures, the same reference signs are used for identical or similar components, even if a repeated description is omitted for reasons of simplicity.

DETAILED DESCRIPTION

Figure 1:
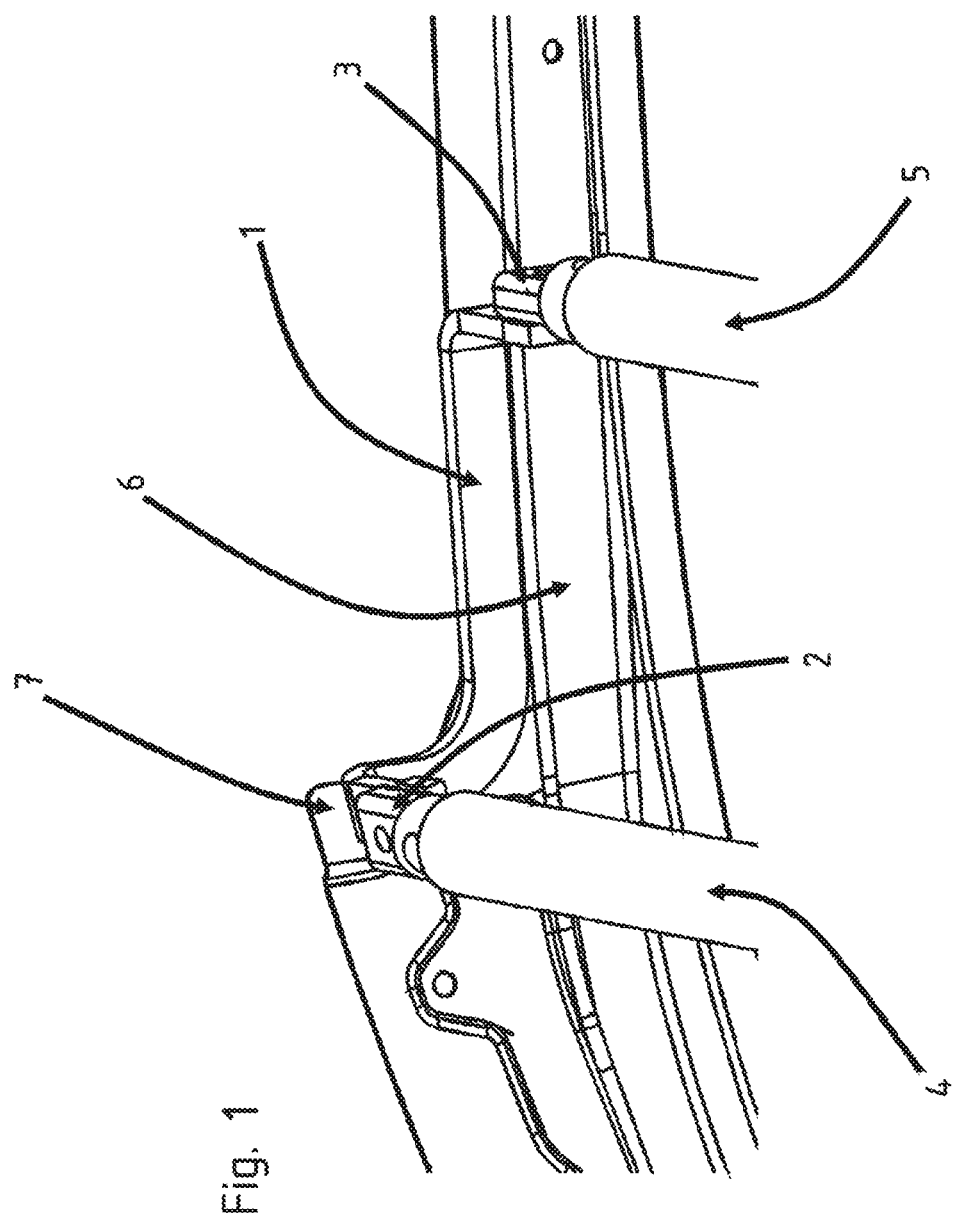
FIG. 1 shows a device according to a first embodiment of the disclosure.

The device for tempering regions of hot-formed and/or press-hardened metal components, illustrated in FIG. 1, has a contact element 1 which is connected to two electrodes 2, 3. In turn, each of the electrodes 2, 3 is connected to a current source (not illustrated in more detail) by way of a cable 4, 5. The support frame and the rest of the worker head are not illustrated in more detail here. The contact element 1 is in contact in regions across the full area with a metal component 6. The metal component 6 in this example has a flange 7 which is to be tempered in regions. The strength of the material is decreased in the tempered regions of the flange 7 so as to later be able to punch out clearances as attachment locations for other components into this region.

Figure 2:
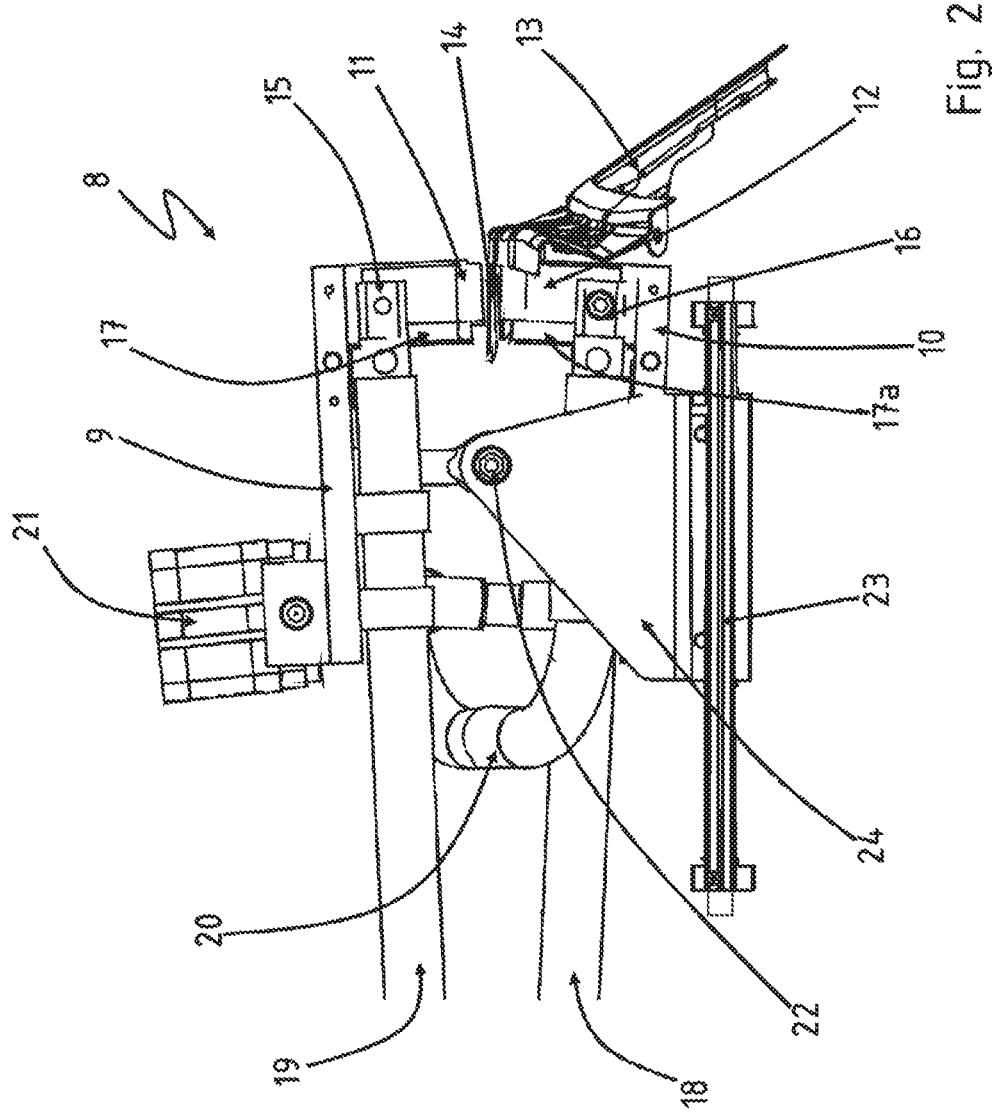
FIG. 2 shows a device according to a second embodiment of the disclosure, in a side view.

A further embodiment of the device is illustrated in FIG. 2. A support frame is again not illustrated here also. The support frame can be a fixed metal construction. However, it is also possible that the support frame is a manipulator or a robot. A worker head can be seen in FIG. 2. The worker head 8 comprises a first mounting part 9 and a second mounting part 10. A first contact element 11 is attached to the first mounting part 9. A second contact element 12 is attached opposite thereto to the second mounting part 10. A metal component 13, the flange region 14 thereof being disposed between the two contact elements 11, 12, can be seen between the two contact elements 11, 12. The metal component 13 is then to be brought to bear across the full area on the contact faces 26, 31 of the contact elements 11, 12. The two contact elements 11, 12 are disposed so as to be movable relative to one another, specifically in such a manner that the flange region 14 of the metal component 13 is clampable between the two contact elements 11, 12. The contact elements 11, 12 are composed of an electrically conductive material, preferably of a high-grade steel. The contact elements 11, 12 are resistively heated, to which end the electrodes 15, 16 are attached to the contact elements 11, 12. In order to guarantee that the current flow is performed exclusively through the contact elements 11, 12, isolation elements 17, 17a by way of which the contact elements 11, 12 are held to be spaced apart from the mounting parts 9, 10 are provided. The electrodes are connected to a current source by way of cables 18, 19, 20.

The cables in the exemplary embodiment illustrated here are disposed such that the contact elements 11, 12 are arranged in a series connection, that is to say that the current flow is directed away from the current source by way of the cable 19 into a first electrode 15 of the first contact element 11. The second electrode 15a (FIG. 3) lying on the opposite side is connected to the electrode 16 on the front side of the second contact element 12 by way of the cable 20. The second electrode 16a (not illustrated) of the second contact element 12 on the opposite side is in turn coupled to the cable 18 which in turn leads to the current source. The complexity in terms of construction is kept low and only a conceivably small installation space is required on account of this connection in series of the contact elements 11, 12.

The two contact elements 11, 12 are movable relative to one another and can be converged or diverged. This is achieved by way of a drive element 21, for example a pneumatic cylinder, which moves the two contact elements 11, 12 by way of a respective motion device, wherein the movement of the contact elements 11, 12 is facilitated by the rotation axle 22.

The worker head 8 is moreover disposed so as to be movable relative to the support frame (not illustrated). This is enabled by way of a rail 23 in this exemplary embodiment. A slide 24 which can be moved in a linear manner on the rail 23 is attached to the worker head 8. This embodiment enables precise and reproducible accurate guiding of the worker head 8 from a resting position to an active position.

Figure 3:
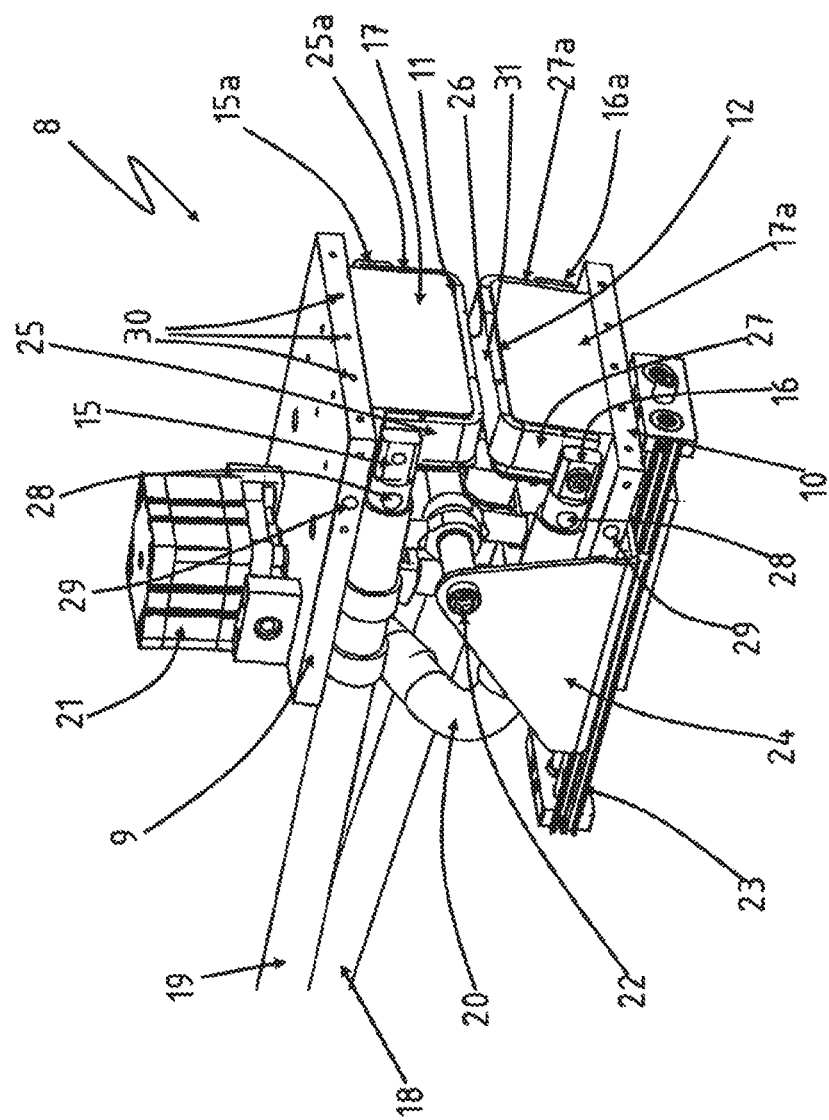
FIG. 3 shows the device according to the second embodiment, in a perspective view.

The same embodiment of the device is illustrated in a perspective illustration in FIG. 3. It becomes yet again evident in this depiction that the contact elements 11, 12 have in each case angled regions 25, 25a, 27, 27a. The contact elements 11, 12 are connected to the electrodes 15, 15a, 16, 16a at these angled regions.

The connection in series of the contact elements by way of the cables 18, 19, 20 becomes somewhat more evident once again here.

The cables 18, 19, 20 in the external jackets thereof have water cooling. Cooling bores 28 are in each case located with the cables 18, 19, 20 directly adjacent to the electrodes 16, 16a, 15, 15a. The cooling bores 28 are connected to corresponding cooling bores 29 in the mounting parts 9, 10. The cooling water is thus routed out of the cable 20, for example, and is directed by way of hoses (not illustrated in more detail) into the second mounting part 10. On account thereof, the second mounting part 10, adjacent to the second contact element 12, is cooled. This means that a thermal shielding is achieved by way of the cooling water such that the exhaust heat of the contact elements 11, 12 does not heat up the mounting parts 9, 10 and thus the entire worker head 8. A corresponding cooling bore 29 on the opposite side of the second mounting part 10 routes the cooling water out again, and a cooling bore 28 routes the cooling water into the cable 18, such that a closed water circuit is also present here across the entire cabling.

Screw bores 30 can furthermore be seen in FIG. 2 and in FIG. 3. Encapsulation elements which for the sake of clarity are likewise not illustrated here are attachable thereto. The encapsulation usually is also composed of a high-grade steel. The encapsulation has the purpose of guaranteeing the safety of the operator of the system, on the one hand, said encapsulation however also serves as a thermal shield which prevents the heat created being radiated outward, on the other hand. The encapsulation offers the added advantage that the isolation elements 17, 17a which in most instances are composed of ceramics and become brittle in the course of the service life thereof cannot readily disintegrate since said isolation elements 17, 17a are kept in place by the encapsulation. The extremely low-maintenance concept of the device in turn becomes advantageous on account thereof.

Figure 4:
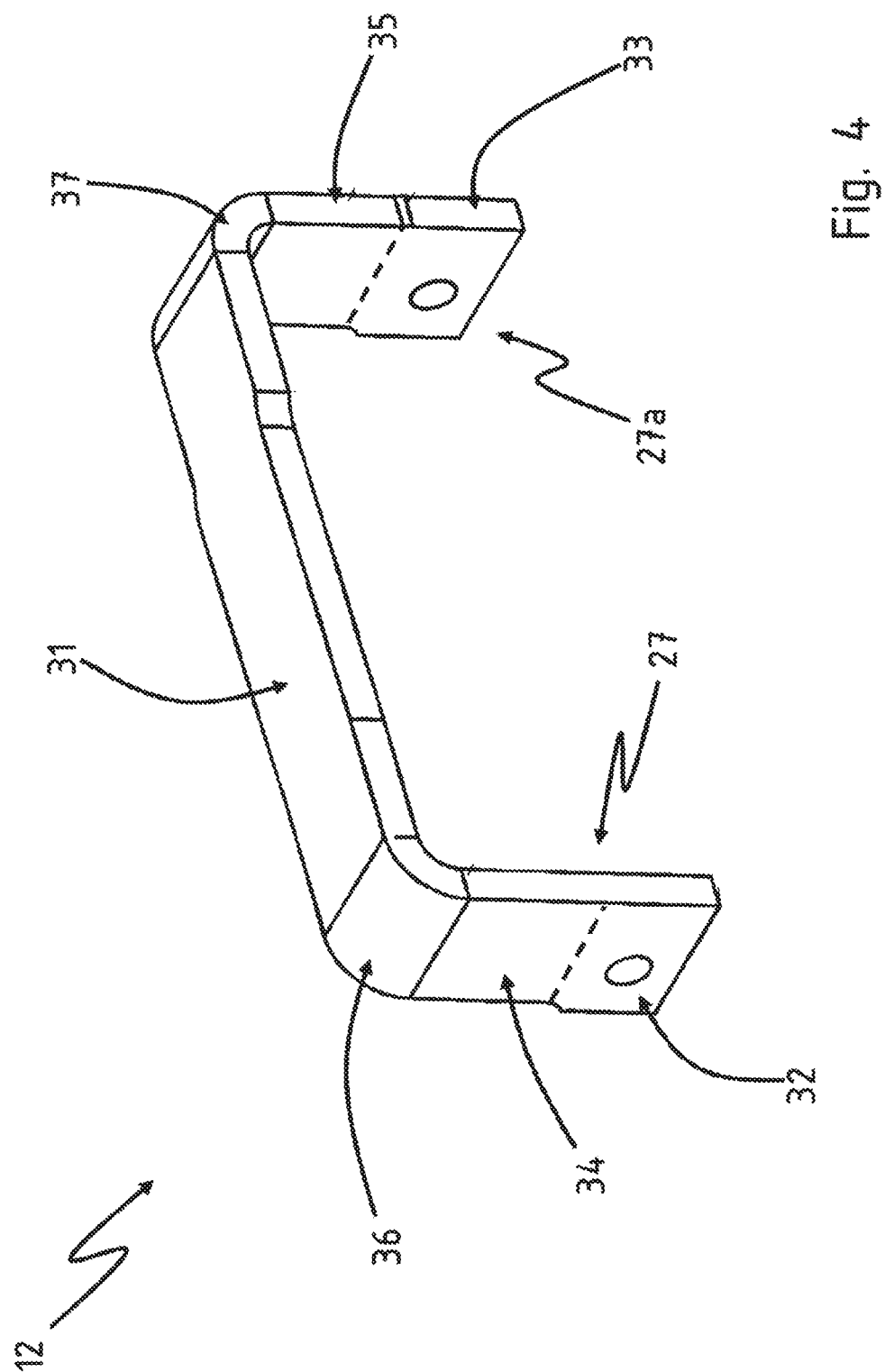
FIG. 4 shows a contact element.

FIG. 4 again shows the first contact element 12 on its own. The angled regions 27, 27a can be readily seen here. Said angled regions 27, 27a are composed of a connection portion 32, 33 and of a transition region 34, 35. The contact element 12 is connected to the respective assigned electrodes 16, 16a (not illustrated here) at the connection portions 32, 33. On account of the water cooling, a temperature of approximately 30° C. prevails in this region. However, the temperature of the contact element 12 in the region of the contact face 31 which later comes into contact across the full area with the metal component 13 is up to 1000° C. and beyond. Accordingly, a transition region 34, 35 where the temperature rises gradually from 30° C. up to 1000° C. is configured. On account of the transition regions 34, 35 being bent away from the contact face 31, it is guaranteed that the uniformly temperature-controlled contact face 31 exclusively comes into contact with the metal component 13. The radius regions 36, 37 are critical here. An increased radiation of heat takes place at these locations such that no sharply delimited transition between a temperature-controlled and a non-temperature-controlled region of the metal component 13 is possible here.

This aspect can optionally be utilized for achieving a gradual transition between a temperature-controlled and a non-temperature-controlled region, if this is envisaged for the respective metal component 13. The radii in the radius regions 36, 37 in this instance can be such that the heat transfer is adapted to the material properties to be set in the metal component 13. However, if a sharp transition between the temperature-controlled and the non-temperature-controlled regions of the metal component 13 is required, the radii in the radius regions 36, 37 are to be chosen as small as possible. In order for such a sharp transition to be achieved, it is also possible for the angled regions 27, 27*a* in the contact element 12 not to be produced with the aid of a bending procedure but for the angled regions 27, 27*a* to be produced as separate components and to be welded to the contact face 31 that is likewise produced separately. This is necessary in particular when extremely small radii are provided. The bending radii possible here are always dependent on the respective material thickness, that is to say the sheet metal thickness of the sheet metal of which the contact element 12 is composed.

Figure 5:
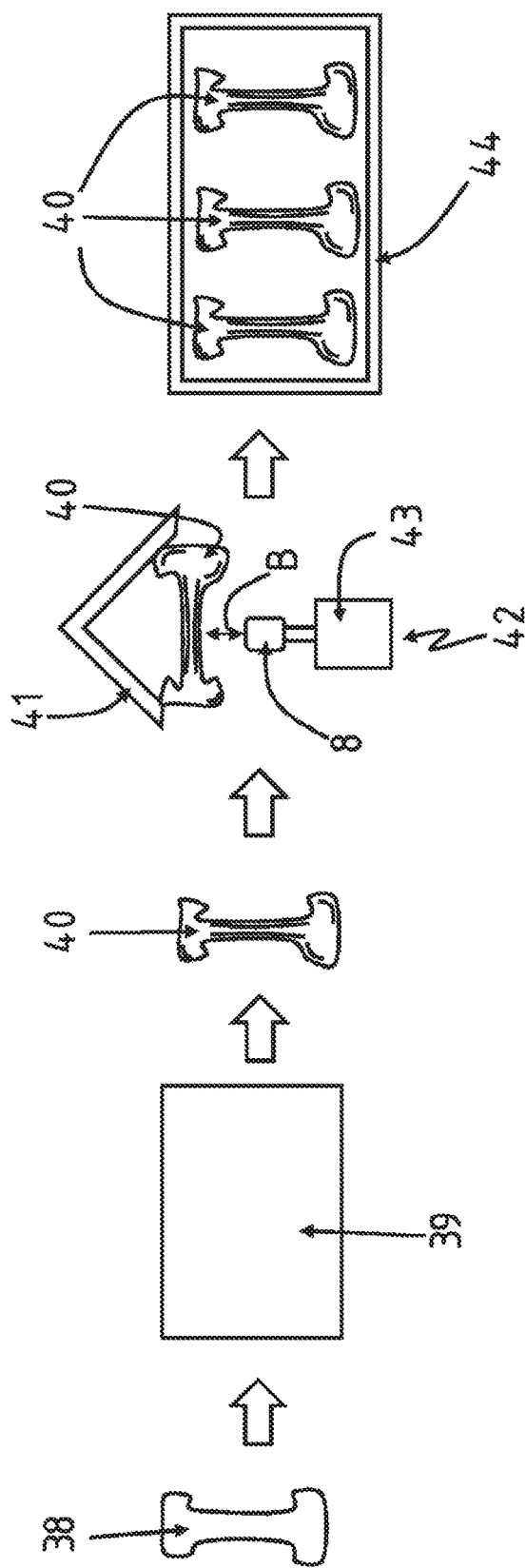
FIG. 5 shows a hot-forming line having a tempering station.

A potential construction of a hot-forming line in which a tempering station having a tempering device 42 is provided is schematically shown in FIG. 5. Here, blanks 38 are formed and press-hardened in a forming station 39. The blanks 40 that are created and formed herein are transferred to another station. The formed blanks 40 in the latter are clamped in a jig 41 and subjected to a tempering procedure. To this end, a tempering device 42 having a support frame 43 and a worker head 8 is provided in the tempering station. The worker head 8 is movable in a linear manner in a movement direction B toward the formed blank 40 and from the formed blank 40 away, respectively. The formed blank 40 is then tempered in regions, that is to say the material properties are set in a localized manner, and said blank 40 is then removed from the jig again and deposited in a storage frame 44 and supplied to further use.

The tempering device 42 provided here in the hot-forming line, on the worker head 8, has a contact element that is composed of an electrically conductive material for heating regions of the non-formed blank 40 by means of a thermal flow, wherein two electrodes for resistively heating the contact element are connected to the contact element per se as well as to a current source.

The electrically conductive contact element which is attached to the worker head 8 is heated to a temperature which is higher than a target temperature to which a region of the formed blank 40 is to be heated. A contact face of the contact element is thereafter brought to bear across the full area at a predefined contact pressure on the region of the metal component to be heated, on account of which the non-formed blank 40 in regions is heated to a target temperature.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A device for tempering regions of hot-formed and/or press-hardened metal components, the device comprising:
   a support frame;
   a worker head, wherein the worker head has at least one contact element of an electrically conductive material for heating a region of a metal component by a thermal flow; and
   electrodes for resistive heating of the contact element, wherein the electrodes are connected to the contact element and a current source,
   wherein the worker head is configured to move relative to the support frame, and
   wherein the contact element has angled regions to which the electrodes are fastened.

2. The device as claimed in claim 1, wherein the at least one contact element is coated with an electrically isolating material.

3. The device as claimed in claim 1, wherein the at least one contact element comprises at least two contact elements configured to move relative to one another on the worker head to clamp the metal component between the contact elements.

4. The device as claimed in claim 1, further comprising:
   a thermally insulating and/or electrically isolating element,
   wherein the at least one contact element and the thermally insulating and/or electrically isolating element are configured to move relative to one another on the worker head to clamp the metal component between the contact element and the thermally insulating and/or electrically isolating element.

5. The device as claimed in claim 1, wherein the worker head is configured to move linearly from a resting position to an active position.

6. The device as claimed in claim 1, wherein the contact element is configured as a sheet-metal component having a contour close to the metal component wherein a contact face of the contact element and the region of the metal component to be heated are contactable across a full area of the region to be heated.

7. The device as claimed in claim 1, wherein the contact element is configured from austenitic stainless steel or ferritic stainless steel.

8. A method of tempering regions of a hot-formed and/or press-hardened metal component, the method comprising:
   heating, by resistive heating, at least one contact element attached to a worker head to a temperature higher than a target temperature to which a region of the metal component is to be heated; and thereafter
   causing, by a predetermined contact pressure, a contact face of the contact element to come in contact across a full area of the region of the metal component to be heated, to heat the metal component, at least in said region and by a thermal flow, to the target temperature,
   wherein the worker head is moved from a resting position to an active position in order for the contact element to contact the metal component, and
   wherein the contact element has angled regions to which electrodes for the resistive heating of the contact element are fastened.

9. The method as claimed in claim 8, wherein the contact element is not heated while in contact with the metal component.

10. The method as claimed in claim 8, wherein the contact pressure is between 100 kPa and 10 MPa.

11. The method as claimed in claim 8, wherein
the at least one contact element comprises two contact elements configured to move relative to one another on the worker head, and
the metal component is clamped between the two contact elements.

12. The method as claimed in claim 8, wherein the contact element contacts the metal component for a predetermined contact-pressure time between 2 seconds and 30 seconds.

13. The method as claimed in claim 8, wherein the contact element, as the active position is reached or thereafter, comes into contact across the full area with the region of the metal component to be heated.

14. The method as claimed in claim 8, further comprising tempering using a device which comprises:
a support frame;
the worker head; and
the electrodes for resistive heating of the contact element, wherein
the electrodes are connected to the contact element and a current source,
the at least one contact element is of an electrically conductive material, and
the worker head is configured to move relative to the support frame.

15. The method as claimed in claim 8, wherein the contact pressure is between 100 kPa and 1 MPa.

16. The method as claimed in claim 8, wherein the contact element contacts the metal component for a predetermined contact-pressure time between 3 seconds and 15 seconds.

\* \* \* \* \*